(12) United States Patent
Wiseman et al.

(10) Patent No.: US 8,694,379 B2
(45) Date of Patent: Apr. 8, 2014

(54) ONE-CLICK POSTING

(75) Inventors: Garry R. Wiseman, Issaquah, WA (US);
Kurt Weber, Seattle, WA (US);
Leonard Smith, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1804 days.

(21) Appl. No.: 11/747,994

(22) Filed: May 14, 2007

(65) Prior Publication Data

US 2008/0288338 A1 Nov. 20, 2008

(51) Int. Cl.
G06Q 30/00 (2012.01)
G06Q 30/02 (2012.01)
H04N 5/225 (2006.01)
H04N 5/232 (2006.01)

(52) U.S. Cl.
CPC ............ *G06Q 30/0277* (2013.01); *G06Q 30/02* (2013.01); *H04N 5/232* (2013.01)
USPC .................................. 705/14.72; 348/207.99

(58) Field of Classification Search
USPC ....................................... 705/14.72
See application file for complete search history.

(56) References Cited

U.S. PATENT DOCUMENTS

| 7,155,508 | B2 | 12/2006 | Sankuratripati et al. |
| 2002/0133404 | A1 | 9/2002 | Pedersen |
| 2002/0161838 | A1 | 10/2002 | Pickover et al. |
| 2004/0054602 | A1 | 3/2004 | Ozaki |
| 2005/0080665 | A1 | 4/2005 | Bowman-Amuah |
| 2005/0165642 | A1* | 7/2005 | Brouze et al. ................... 705/14 |
| 2006/0010108 | A1 | 1/2006 | Greenberg |
| 2006/0218035 | A1 | 9/2006 | Park et al. |
| 2006/0218577 | A1 | 9/2006 | Goodman et al. |
| 2007/0050253 | A1 | 3/2007 | Biggs et al. |
| 2008/0201218 | A1* | 8/2008 | Broder et al. ................... 705/14 |

OTHER PUBLICATIONS

Langheinrich, et al. "Unintrusive Customization Techniques for Web Advertising" http://www.vs.inf.ethz.ch/publ/papers/www8-adwiz/ last viewed Apr. 5, 2007, 18 pages.
Kazienko, et al. "Personalized Web Advertising Model" (2004) Lecture Notes in Computer Science Adaptive Hypermedia & Adaptive Web-Based Systems, Springer Berlin/Heidelberg, pp. 146-155.
Baudisch, et al. "User-Configurable Advertising Profiles Applied to Web PAge Banners" (1997) Proceedings of the 1st Berlin Economics Workshop, 6 pages.
Gatarski, et al. "Evolutionary Banners: An Experiment With Automated Advertising Design" (1998) Conference Paper Subjected to COTIM-99, 8 pages.

* cited by examiner

*Primary Examiner* — William A Brandenburg
(74) *Attorney, Agent, or Firm* — Dave Ream; Peter Taylor; Micky Minhas (57) ABSTRACT

The claimed subject matter provides a system and/or a method that facilitates automatically generating an advertisement. An interface component can receive a portion of image data related to at least one of a good or a service associated with a transaction. An automatic posting component can automatically generate an advertisement with a portion of descriptive data related to at least one of the good or the service based at least in part upon the image data, wherein the created advertisement is published to an environment for exposure.

20 Claims, 10 Drawing Sheets

ONE-CLICK POSTING

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and become more robust, secure and reliable, more consumers, wholesalers, retailers, entrepreneurs, educational institutions and the like are shifting paradigms and employing the Internet to perform business rather than using (?) traditional means. For example, today consumers can access their bank accounts on-line (e.g., via the Internet) and perform an ever growing number of banking transactions such as balance inquiries, fund transfers, bill payments, and the like.

Typically, an on-line session can include individuals interfacing with client applications (e.g., web services) to interact with a database server that stores information accessible to the client applications. For instance, a stock market web site can provide users with tools to retrieve stock quotes and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

Based on the ever-increasing use of the computer and/or the Internet, numerous transactions related to goods, services, and/or commerce have become commonplace. Although the use of the computer and/or the Internet for transactions has rapidly increased with vast improvements related thereto, techniques and mechanisms for uploading and/or posting data related to online transactions is lagging far behind. Conventional procedures for posting and/or listing advertisements via the Internet often require several tedious steps which can be time-consuming, inefficient, and extremely meticulous. Moreover, an average user can be dissuaded from posting/listing advertisements online based solely on the required level of involvement, wherein such exclusion can deteriorate the effectiveness and broad reach of online transactions.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate automatically generating an advertisement for online posting and/or listing. An automatic posting component can receive image data (e.g., data related to a picture, video data, audio data, etc.) via an interface to automatically generate an advertisement that can be published and/or exposed to an online environment. In general, the automatic posting component can employ a "one-click" feature and/or technique that, upon activation, automatically captures a portion of image data, creates an advertisement with descriptive data, and publishes the advertisement to an environment with minimal user intervention. The automatic posting component can create an advertisement for any suitable good and/or service related to a transaction. Furthermore, the automatic posting component can be utilized in connection with any suitable camera-based device and/or a device that can capture image data, audio data, video data, etc.

In accordance with an aspect of the subject innovation, a template component can provide a template for structure and/or layout for data associated with the automatically created advertisement. Moreover, a populate component can identify descriptive data related to the advertisement and/or captured image data, wherein such descriptive data can be annotated to the advertisement to provide an informative advertisement for publishing. In addition, the automatic posting component can utilize a location component that can ascertain geographic data to be included with the advertisement. The automatic posting component can further include an exclusivity component that enables a portion of an environment to be exposed to the automatically created advertisement. In other aspects of the claimed subject matter, methods are provided that facilitate creating an online advertisement with minimal user intervention.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . .), optical disks (e.g., compact disk (CD), digital versatile disk (DVD) . . .), smart cards, and flash memory devices (e.g., card, stick, key drive . . .). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 1:
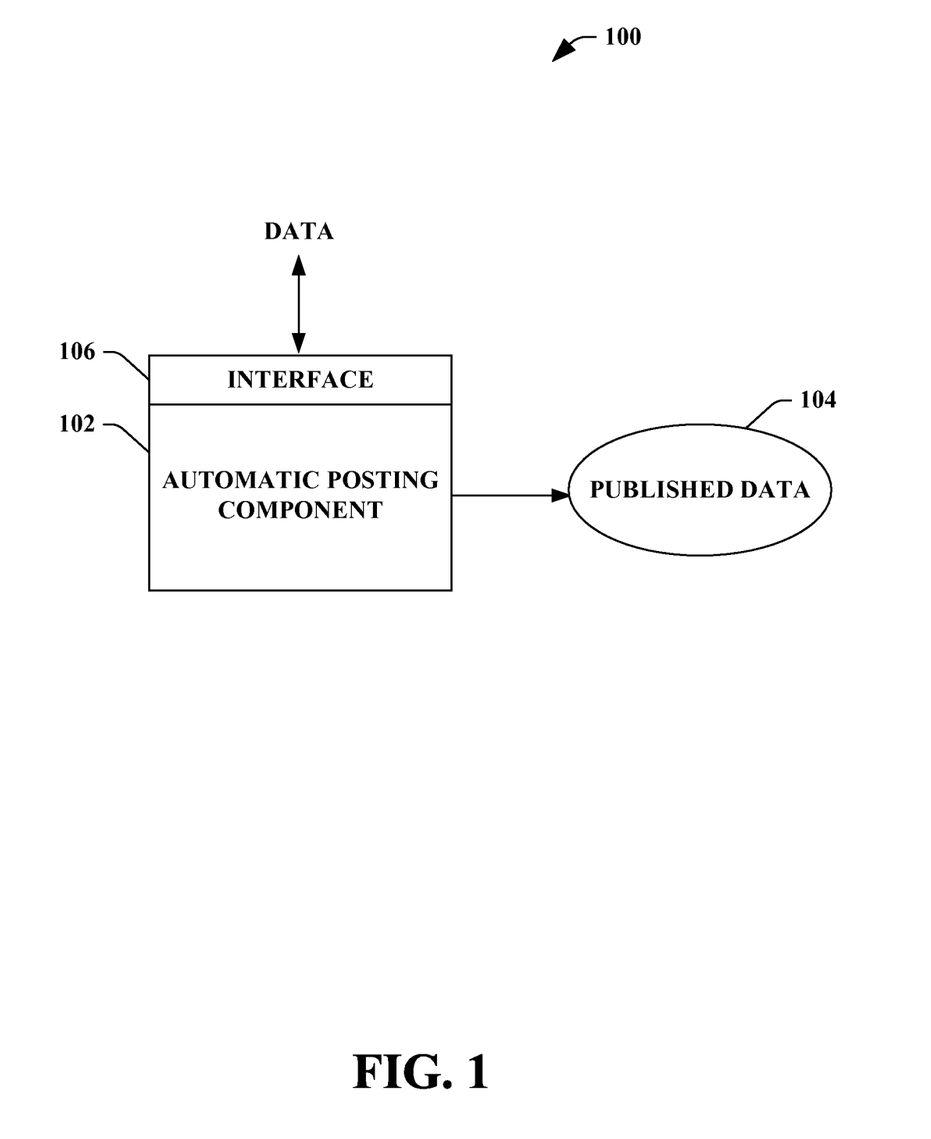
FIG. 1 illustrates a block diagram of an exemplary system that facilitates automatically generating an advertisement for online posting and/or listing.

Now turning to the figures, FIG. 1 illustrates a system 100 that facilitates automatically generating an advertisement for online posting and/or listing. The system 100 can include an automatic posting component 102 that can create published data 104 (e.g., an advertisement, a listing, a posting, an ad, an item for sale, a service for sale, etc.) based at least in part upon image data received via an interface component 106 (discussed in more detail below), wherein such published data 104 can be automatically published in a specific format to any suitable environment (e.g., the Internet, a network, a networked community, a forum, a website, a blog, an email list server, an email address, a social network, a server, a group, a user, a company, a business, etc.). It is to be appreciated that image data can include data related to a picture, a graphic, a video, a portion of video, etc. In particular, the automatic posting component 102 can receive a portion of image data that can be utilized to automatically generate an advertisement and/or a listing to be published for exposure with minimal user interaction. For instance, a user can employ a "one-click" technique to capture image data (e.g., picture, video, etc.) related to a good and/or a service and create a published advertisement and/or listing associated with such good or service. Furthermore, the automatic posting component 102 can enable the advertisement and/or listing based on the portion of image data to be selectively distributed to an environment for limited exposure. For example, rather than publishing the automatically generated listing and/or advertisement to the entire Internet, a particular group of users can be identified for distribution.

In other words, the automatic posting component 102 can enable the creation of advertisements and/or listings related to an image with a "one-click" technique. The "one-click" technique provides the capturing of good/service imagery (e.g., still picture data, video data, etc.) and the generation of an advertisement and/or listing with information to aid in describing the good/service. For example, the automatic posting component 102 can be utilized in connection with any suitable device that can capture an image (discussed in more detail below) or a plurality of images (e.g., video clip, portion of video, etc.), wherein such device can employ a "one-click" feature that publishes the image and additional data describing such image for exposure to a particular environment (e.g., the Internet, a social network, a network, a networked community, a forum, a website, a blog, an email list server, an email address, a server, a group, a user, a company, a business, etc.). It is to be appreciated that the image data can be related to any suitable good/service associated with a transaction (e.g., commercial, retail, wholesale, auction, bulk, etc.) such as, but not limited to, a good (e.g., clothing, furniture, computer, food, electronics, literature, hardware supplies, construction material, textiles, etc.), an item (e.g., a used compact disc, a lawnmower, etc.), a portion of a service (e.g., a rental service, a cleaning service, financial service, demolition, construction, car repair, home repair, etc.), a portion of property, a portion of real estate, a stock, a mutual fund, a portion of a portfolio, insurance, or a portion of a commodity.

In addition, the system 100 can include any suitable and/or necessary interface component 106 (herein referred to as "interface 106"), which provides various adapters, connectors, channels, communication paths, etc. to integrate the automatic posting component 102 into virtually any operating and/or database system(s) and/or with one another. In addition, the interface component 106 can provide various adapters, connectors, channels, communication paths, etc., that provide for interaction with the automatic posting component 102, the published data 104, and/or any other component, data and the like associated with the system 100.

Figure 2:
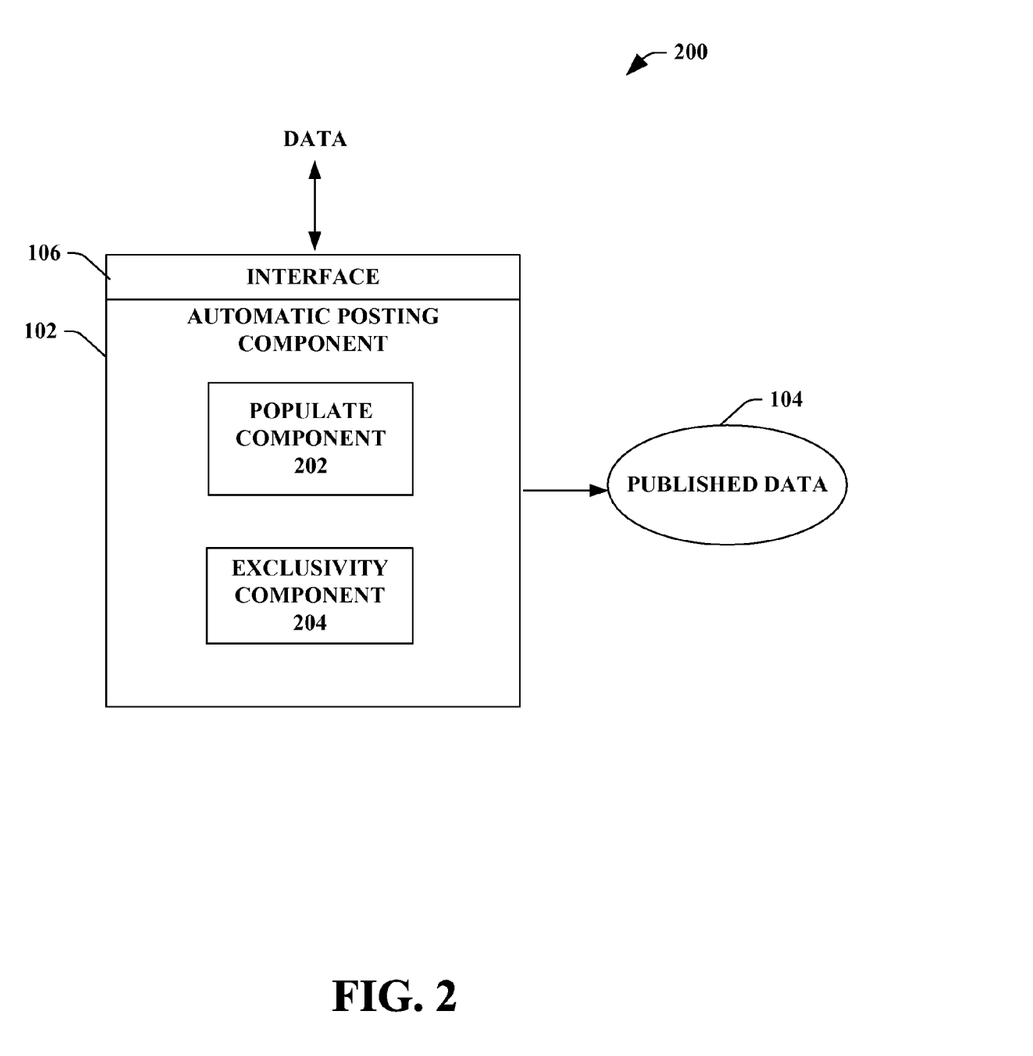
FIG. 2 illustrates a block diagram of an exemplary system that facilitates annotating and selectively listing a portion of data online for advertisement.

FIG. 2 illustrates a system 200 that facilitates annotating and selectively listing a portion of data online for advertisement. The system 200 can include the automatic posting component 102 that can receive image data (e.g., still picture data, video data, etc.) to base the creation of an advertisement or a listing with descriptive data, wherein the advertisement can be published to an environment in order to initiate a transaction with minimal user interaction. For instance, the automatic posting component 102 can employ a "one-click" feature that enables an image or a plurality of images (e.g., video, etc.) to be captured, descriptive data to be generated, and an advertisement for such image(s) to be created and published online to an environment in order to entice potential customers to participate in a transaction. It is to be appreciated that the automatic posting component 102 can utilize the "one-click" feature in connection with a device, a camera, a video camera, a video device, an accessory for a camera, an accessory for a device, a portion of software, a piece of hardware, etc. In addition, it is to be appreciated that the "one-click" feature need not be a "click" activation but rather can be any suitable activation such as, but not limited to, a button, a voice command, a switch, a touch-button, a touch-screen activation, a motion detection activation, a timer delayed switch/button, a slider, etc.

The automatic posting component 102 can include a populate component 202 that can identify a portion of descriptive data related to the received image data (e.g., video data, picture data, etc.). For example, the populate component 202 can identify descriptive data by at least one of the following: receiving audio input from a user and converting such speech to text; dynamically extracting key words from text and filling appropriate fields; or using pattern recognition on the received image data. It is to be appreciated that the descriptive data can be text, additional images, contact information, sale price, transaction details, shipping information, instruction manuals, product details, manufacturer information, pricing details, terms of sale, seller information, geographic data, profile data, listing field data, or any suitable data related to the image, etc. Furthermore, the populate component 202 can utilize a service that can provide descriptive data. For example, image data can be received and the populate component 202 can utilize a service to provide descriptive text and transaction data (e.g., terms, price, shipping, etc.) for the advertisement in an aesthetically pleasing format/layout. In addition, such service can be associated with the target environment (e.g., the environment to which the advertisement is to be published) to further simplify posting data online.

The automatic posting component 102 can further utilize an exclusivity component 204 that can selectively identify entities (e.g., users, businesses, groups, machines, computers, websites, networks, servers, email addresses, user profiles, etc.) to expose the generated advertisement within the target environment. In other words, the exclusivity component 204 can limit and/or broaden the distribution and/or publication of the advertisement and/or listing. Conventionally, advertisements are distributed to all users and advertisers pay on a per-click basis. The exclusivity component 204 enables a user to automatically post an advertisement (e.g., for free or for a small cost) to a specific group of users within an environment (e.g., the Internet, a social network, a network, a networked community, a forum, a website, a blog, an email list server, an email address, a server, a group, a user, a company, a business, etc.). For instance, a user can advertise just to a select group of friends that a band is playing on Saturday at a local park.

Figure 3:
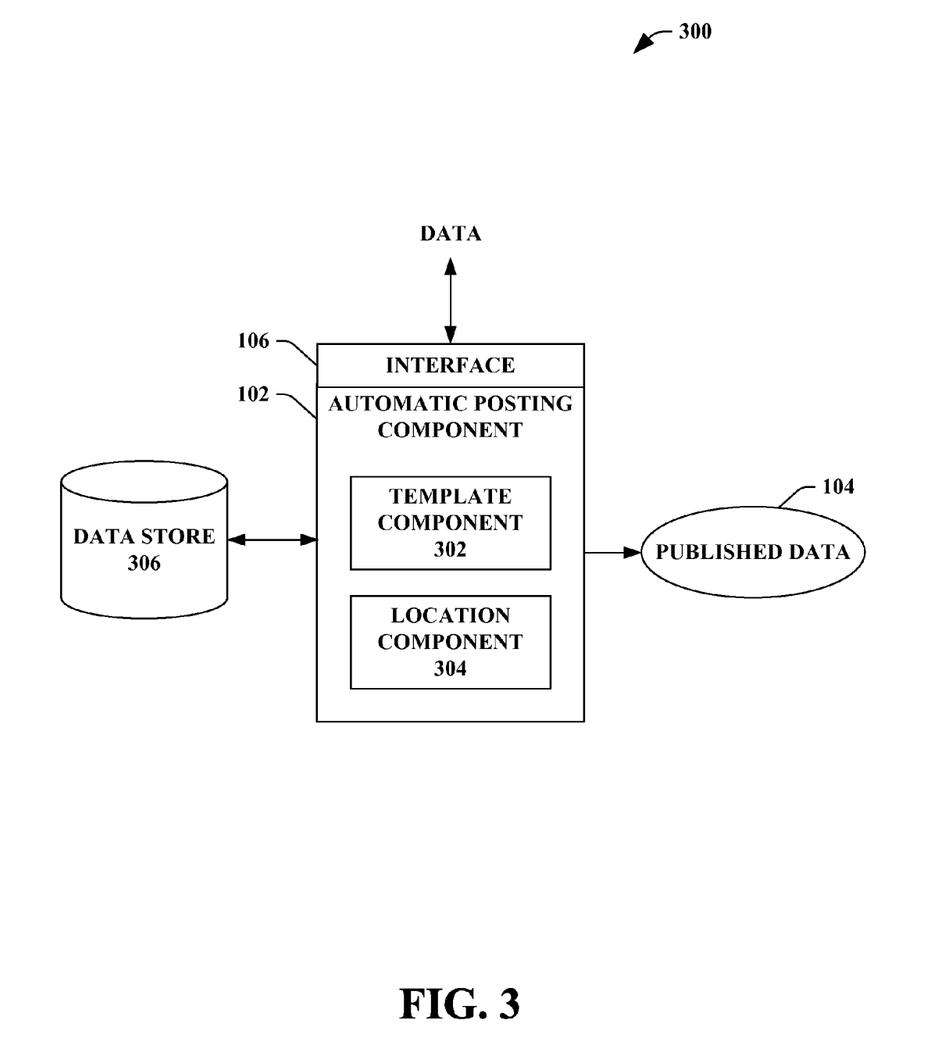
FIG. 3 illustrates a block diagram of an exemplary system that facilitates creating an online advertisement with minimal user intervention.

FIG. 3 illustrates a system 300 that facilitates creating an online advertisement with minimal user intervention. The system 300 can employ the automatic posting component 102 that can automatically generate an advertisement and/or listing with descriptive data based upon image data (e.g., picture data, video data, etc.), wherein the advertisement and/or listing can be published online (e.g., published data 104) to an environment. The automatic posting component 102 can receive a portion of an image and create an advertisement and/or posting related to such image including descriptive text, terms, price, etc. with the implementation of a "one-click" feature. In other words, the automatic posting component 102 can capture an image, abstract information associated with the image, and publish the image with annotated data as an advertisement online in an environment with "one-click" and/or one activation/operation. Additionally, the automatic posting component 102 can include a plurality of settings and/or configurations related to publishing (e.g., time, amount, duration, etc.), target environment, terms of sale, negotiations, information to describe the image, pricing, audience to expose, user identification (e.g., profiles, location, etc.), geographic data, privacy settings related to published data, templates, and the like which can be determined automatically, manually, and/or any suitable combination thereof.

The automatic posting component 102 can utilize a template component 302 that can employ various templates and/or formats for the automatically generated advertisements and/or listings. For example, the template component 302 can provide standardized templates, user-defined templates, and/or standardized templates edited by a user. Moreover, the template component 302 can provide a service, community, and/or a forum which allows various users to share, distribute, sell, etc. templates (e.g., template sharing, template distribution, template sharing, template purchasing, template tips, template techniques, template creation help, or template assistance). It is to be appreciated that any suitable templates can be utilized with the automatic posting component 102, wherein such templates can be based on various factors such as, but not limited to, image type, image size, item, good, service, target environment, target audience, type/nature of posting or advertisement, cost, terms, geographic location, device used to capture image data, any suitable characteristic related to an advertisement, etc. For example, a specific template can relate to used goods/items that are to be sold by a particular user on an auction website in which the template includes optimal characteristics (e.g., font, size, image location, layout, text layout, organization of descriptive data, etc.) and/or seller/owner information (e.g., location, shipping costs, terms of sale, user profile, user rating, etc.).

The automatic posting component 102 can utilize a location component 304 that can ascertain geographic data related to the received image data. The location component 304 can utilize any suitable technique to identify a geographic location associated with a good and/or service to which image data relates, wherein the technique can be, but is not limited to: a global positioning system (GPS), phone number geographic tracking, triangulation, location registry, cell tower location, user-informed location data, location registration based upon image capture, etc. The location data can be associated with at least one of the good, the service, a seller, an owner, a user profile, a user location, a residence, or a place of business, etc. Moreover, upon identifying the location associated with a captured image (e.g., still picture data, video data, etc.), the system 300 can populate and/or annotate the generated advertisement and/or listing with such geographic data.

For example, a user can take a picture or video of a car that he or she would like to sell with his camera device (e.g., smartphone, digital camera, portable digital device (PDA), laptop, etc.). The geographic location can be determined or approximated by at least one of global positioning system (GPS) or phone number association associated with the device or from his user profile (e.g., preset location). If more than one location is indicated, the user can select the desired location for each particular item. As discussed, descriptive data can be automatically populated for the advertisement and/or listing. For instance, the descriptive data can be populated by at least one of the following: receiving audio input from the user and converting such speech to text; dynamically extracting key words from text and filing in fields; utilizing a service to provide descriptive data; user-defined descriptive data; and/or using pattern recognition on the image. Such advertisements and/or listings can be generated in such a manner for wanted items or items for sale/exchange/free.

The system 300 can further include a data store 306 that can include any suitable data related to the automatic posting component 102 and the published data 104. For instance, the data store can include automatic posting settings, configuration data related to the advertisement/listing, templates, location, user profiles, distribution lists, environment lists, environment settings, publishing settings, historic data related to advertisements/listings, advertisements, listings, postings, image data, video data, format data, layout data, descriptive data, any suitable data related to the system 300, any data related to commerce, and/or any suitable data related to a transaction, etc.

It is to be appreciated that the data store 306 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 306 of the subject systems and methods is intended to comprise, without being limited to, these and any other suitable types of memory. In addition, it is to be appreciated that the data store 306 can be a server, a database, a hard drive, and the like.

Figure 4:
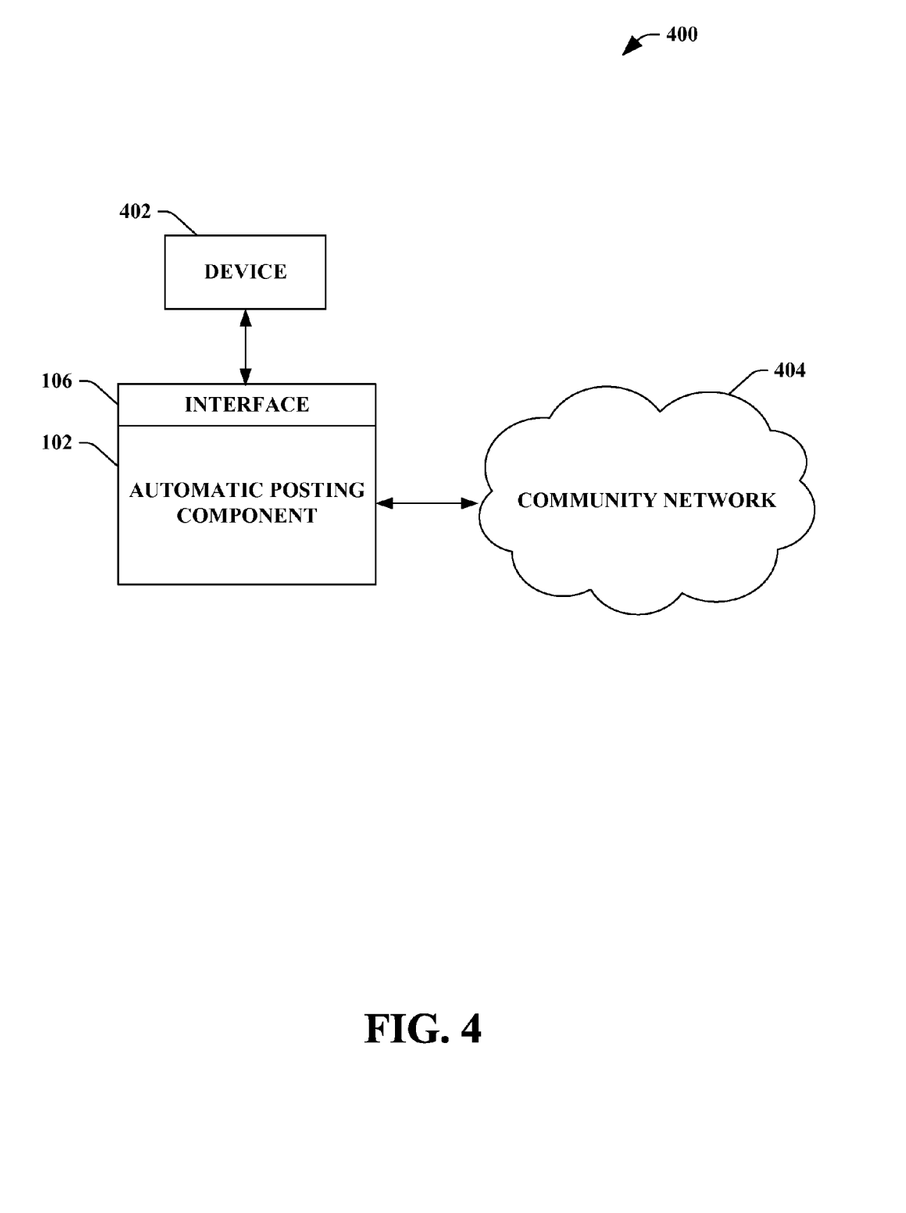
FIG. 4 illustrates a block diagram of an exemplary system that facilitates listing a portion of data from a device to an online community network.

FIG. 4 illustrates a system 400 that facilitates listing a portion of data from a device to an online community network. The system 400 can employ the automatic posting component 102 to receive image data (e.g., video data, still picture data, etc.) captured by a device 402. The device 402 can be any suitable device that can capture image data or video data such as, but not limited to, a camera, a camera portable device, a video camera, a video device, a camera cellular phone, a portable digital assistant, a laptop, a smartphone, a hand-held device, a camera-based computing device, a mobile communications device, a portable device, a device including a camera, a web-cam, a desktop camera device, etc. Moreover, the device 402 can capture image data in any suitable format such as, but not limited to, a video format, a device-specific file format, Joint Photographic Experts Group (JPEG), Bitmap, Portable Network Graphics (PNG), Tagged Image File Format (TIF), Graphics Interchange Format (GIF), metafile, etc. Although the automatic posting component 102 is depicted as a stand-alone component, it is to be appreciated that the automatic posting component 102 can be incorporated into the device 402. For example, the device 402 can include the "one-click" feature and/or technique to allow the automatic capturing of an image, generating an advertisement with descriptive data, and posting and/or publishing such advertisement.

The automatic posting component 102 can receive the image data (e.g., video data, picture data, etc.) via the interface 106, wherein an advertisement and/or listing can be automatically created with descriptive data and published to an environment such as a community network 404. The community network 404 can be a network including at least one client, user, entity, etc. In one example, the community network 404 can be a network associated with commerce and/or transactions related to commerce such as buying an item, selling an item, buying a portion of a service, selling a portion of a service, etc. In another example, the community network 404 can be a website related to auctioning goods, items, services, etc. For instance, the automatic posting component 102 can publish and/or expose the automatically created advertisement and/or listing to the community network 404, wherein a client, user, entity, etc. related thereto can be targeted with such advertising. By implementing the automatic posting component 102, posting a listing or an advertisement to the community network 404 is greatly enhanced and simplified by reducing manual intervention with the "one-click" feature.

Figure 5:
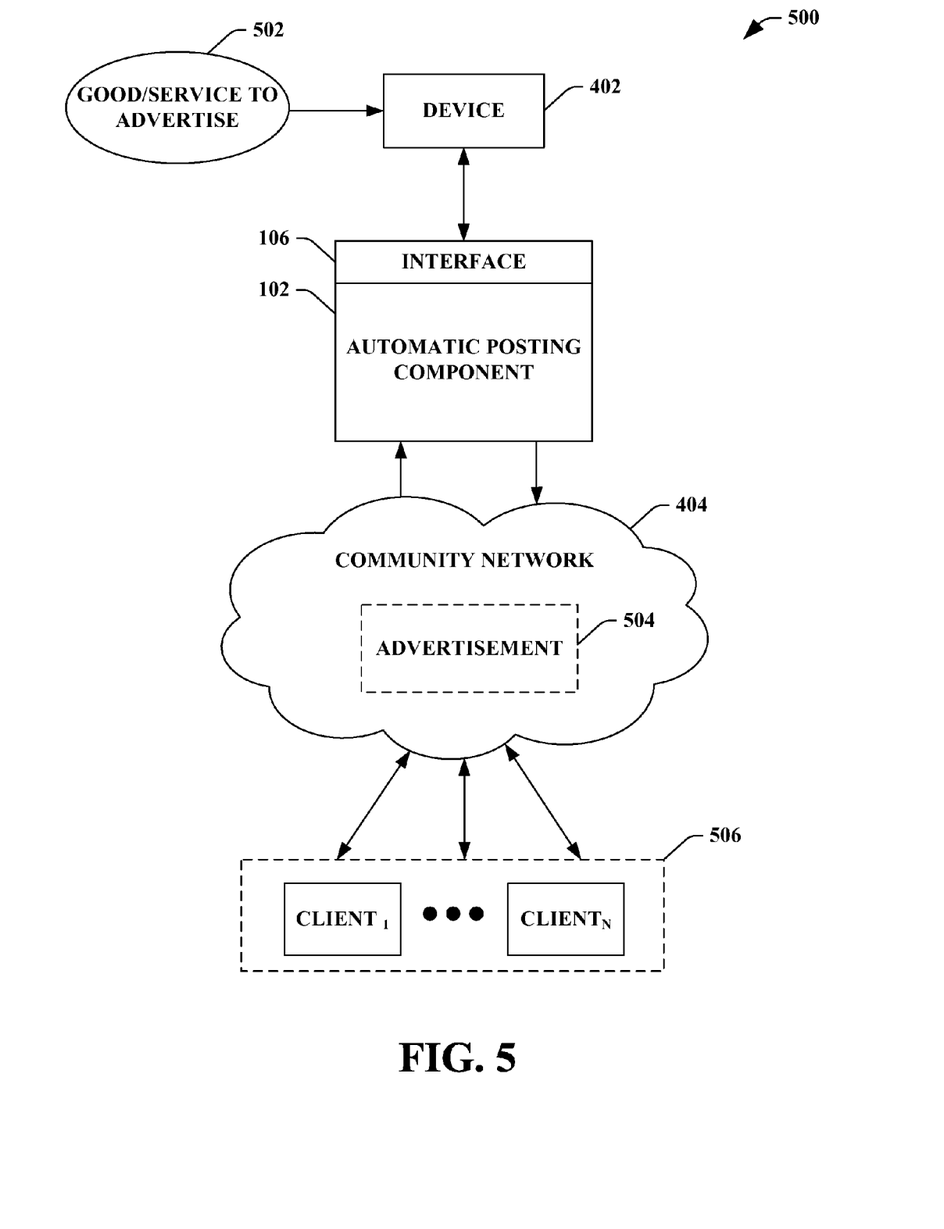
FIG. 5 illustrates a block diagram of an exemplary system that facilitates automatically generating an advertisement that is exposed to the Internet based at least in part upon image data captured by a device.

FIG. 5 illustrates a system 500 that facilitates automatically generating an advertisement that is exposed to the Internet based at least in part upon image data captured by a device. The system 500 can include the automatic posting component 102 that can receive image data from the device 402 via the interface 106 to automatically create an advertisement and/or a posting for exposure and/or publishing to an online environment. In general, the automatic posting component 102 can implement a "one-click" technique which can allow the automatic capturing of an image or video, the creation of an advertisement for the image, population of descriptive data for the image, and posting of the advertisement to an environment. As discussed, such "one-click" technique and/or feature can be implemented with the device 402 and/or any suitable camera-based device or video-based device.

The device 402 can capture image data (e.g., video data, picture data, etc.) related to a good/service 502 that is to be advertised based at least in part upon the activation of the "one-click" feature and/or technique. It is to be appreciated that the good/service 502 can be any suitable good/service that can be associated with a transaction (e.g., commercial, retail, wholesale, auction, bulk, etc.) such as, but not limited to, a good (e.g., clothing, furniture, computer, food, electronics, literature, hardware supplies, construction material, textiles, etc.), an item (e.g., a used compact disc, a lawnmower, etc.), a portion of a service (e.g., a rental service, a cleaning service, financial service, demolition, construction, car repair, home repair, etc.), a portion of property, a portion of real estate, a stock, a mutual fund, a portion of a portfolio, insurance, a portion of a commodity, etc. Once captured, the automatic posting component 102 can create an advertisement 504 for the captured image data. For example, the format and/or layout of the advertisement 504 can be based upon a template (e.g., standardized, user-defined, user-defined standard template, etc.), wherein such advertisement 504 can be populated with descriptive data automatically, manually, and/or any suitable combination thereof. Once created, the advertisement 504 can be published to an environment such as, for instance, the community network 404 having clients 506. It is to be appreciated that there can be any suitable number of clients 506 such as client 1 to client N, where N is a positive integer. Furthermore, as discussed above, the automatic posting component 102 can selectively publish the advertisement 504 such that a portion of the clients 506 can be exposed and/or access the advertisement 504.

Figure 6:
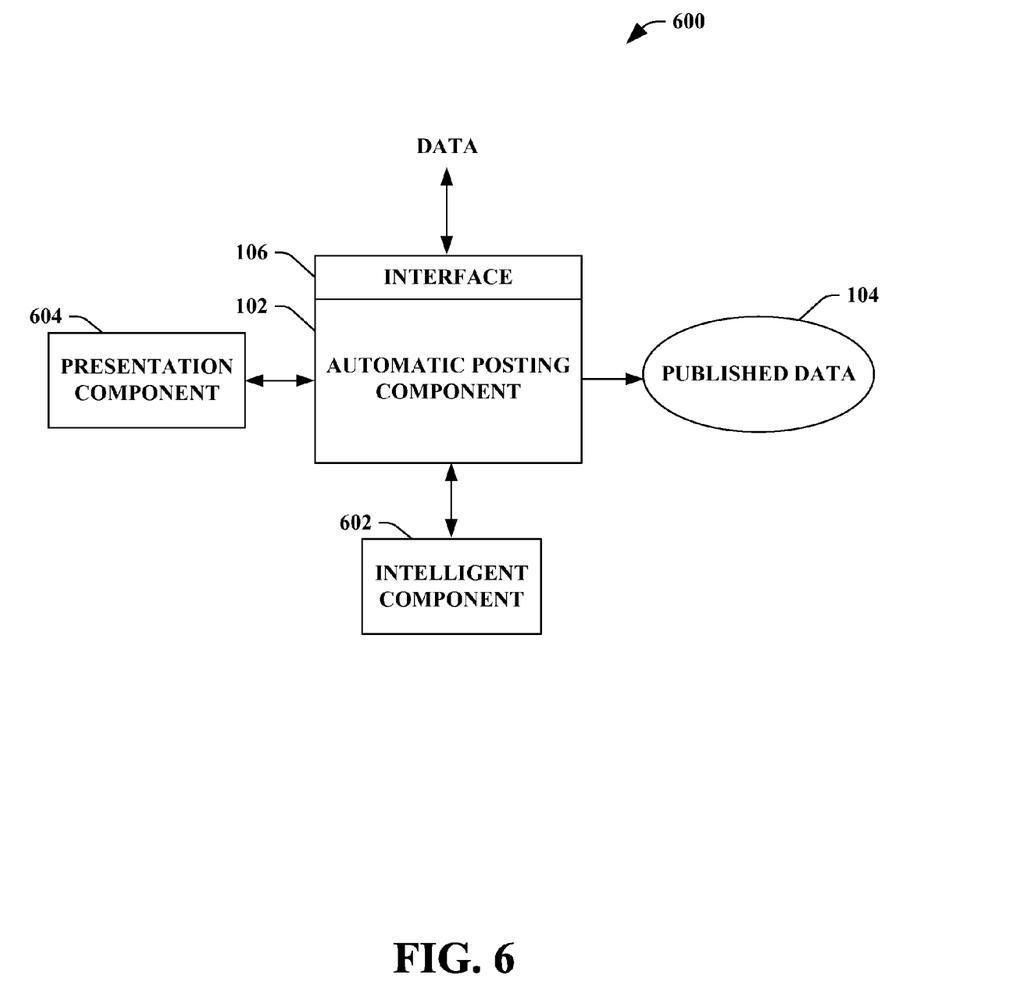
FIG. 6 illustrates a block diagram of an exemplary system that facilitates automatically generating an advertisement for online posting and/or listing.

FIG. 6 illustrates a system 600 that employs intelligence to facilitate automatically generating an advertisement for online posting and/or listing. The system 600 can include the automatic posting component 102, the interface 106, and the published data 104, wherein it is to be appreciated that the automatic posting component 102, the published data 104, and the interface 106 can be substantially similar to respective components, published data, and interfaces described in previous figures. The system 600 further includes an intelligent component 602. The intelligent component 602 can be utilized by the automatic posting component 102 to facilitate creating an advertisement, describing the advertisement, and/or publishing/posting the advertisement. For example, the intelligent component 602 can infer advertisement descriptive data, layouts, formats, image data, transactional details, terms of sale, geographic location, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The automatic posting component 102 can further utilize a presentation component 604 that provides various types of user interfaces to facilitate interaction between a user and any component coupled to the automatic posting component 102. As depicted, the presentation component 604 is a separate entity that can be utilized with the automatic posting component 102. However, it is to be appreciated that the presentation component 604 and/or similar view components can be incorporated into the automatic posting component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the automatic posting component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
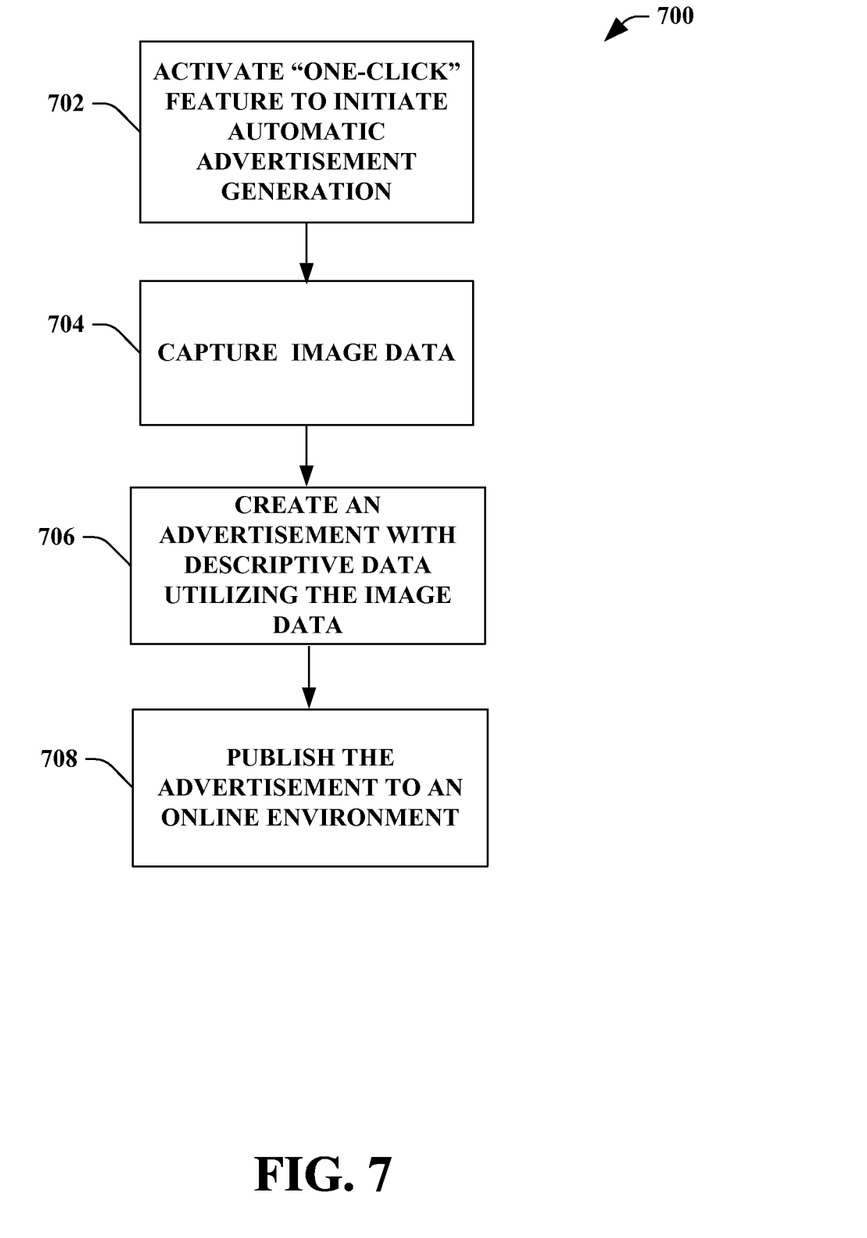
FIG. 7 illustrates an exemplary methodology for automatically generating an advertisement that is exposed to the Internet based at least in part upon image data captured by a device.
Figure 8:
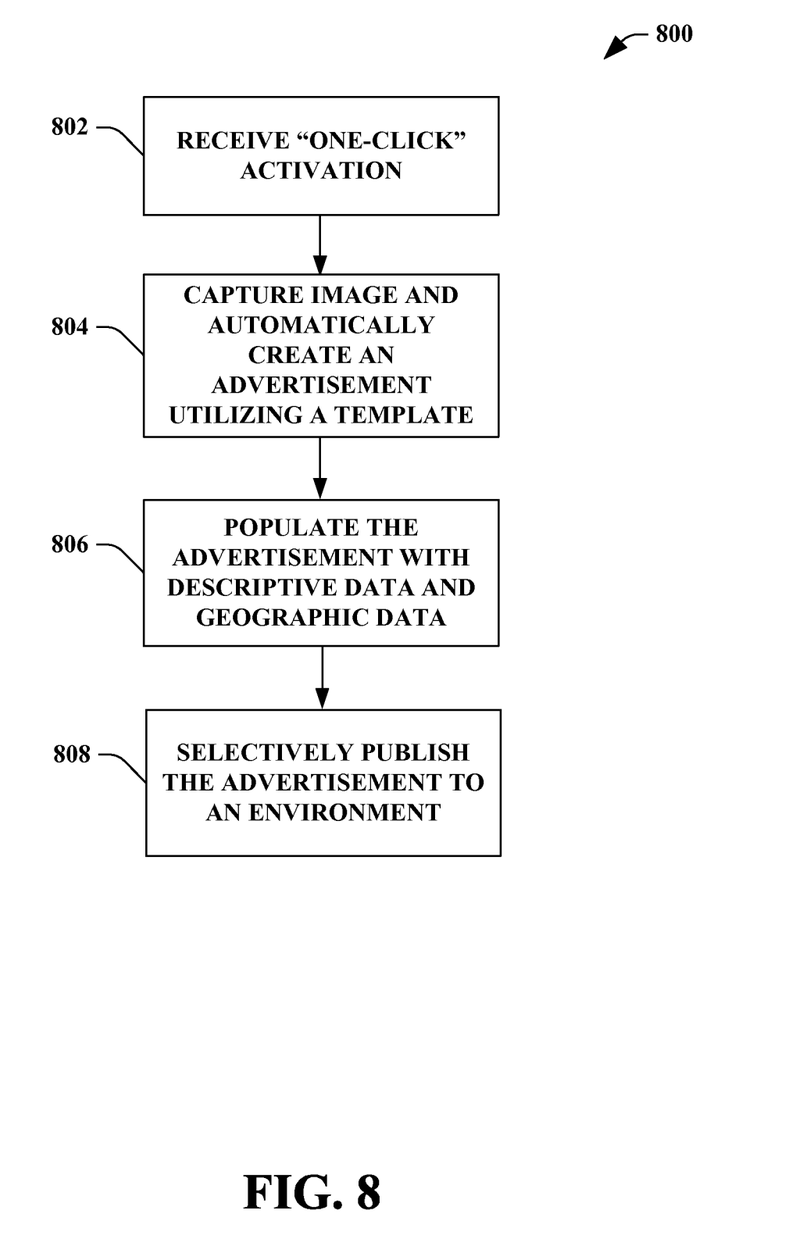
FIG. 8 illustrates an exemplary methodology that facilitates annotating and selectively listing a portion of data online for advertisement.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for automatically generating an advertisement that is exposed to the Internet based at least in part upon image data captured by a device. At reference numeral 702, a "one-click" feature can be activated to initiate an automatic advertisement generation. The "one-click" feature can be any suitable activation associated with capturing an image and automatically creating an advertisement related thereto. In addition, it is to be appreciated that the "one-click" feature need not be a "click" activation but rather can be any suitable activation such as, but not limited to, a button, a voice command, a switch, a touch-button, a touch-screen activation, a motion detection activation, a timer delayed switch/button, a slider, etc.

At reference numeral 704, image data (e.g., still picture data, video data, etc.) can be captured based at least in part upon the activation of the "one-click" feature. The image data can be captured by any suitable device that can collect and/or capture images or video. Furthermore, it is to be appreciated that the image data captured can be related to any suitable good/service associated with a transaction.

At reference numeral 706, an advertisement with descriptive data can be created utilizing the image data. The advertisement can be automatically created for the image or collection of images (e.g., video, etc.), wherein the advertisement can be populated and/or annotated with descriptive data. For example, the descriptive data can be text, additional images, contact information, sale price, transaction details, shipping information, instruction manuals, product details, manufacturer information, pricing details, terms of sale, seller information, geographic data, profile data, listing field data, or any suitable data related to the image, etc. At reference numeral 708, the advertisement can be published to an online environment. For instance, the online environment can be, but is not limited to being, the Internet, a social network, a network, a networked community, a forum, a website, a blog, an email list server, an email address, a server, a group, a user, a company, a business, etc. Thus, the methodology 700 enables an advertisement to be automatically created, populated with descriptive data, and published to an online environment based upon the activation of the "one-click" feature.

FIG. 8 illustrates a methodology 800 that facilitates annotating and selectively listing a portion of data online for advertisement. At reference numeral 802, an activation can be received such a "one-click" activation. For example, the "one-click" activation can be received by any suitable device with at least one of a camera or image capturing ability. At reference numeral 804, an image can be captured and an advertisement can be automatically generated utilizing a template based on the "one-click" activation. It is to be appreciated that image data can include data related to a picture, a graphic, a video, a portion of video, etc. Moreover, a plurality of images can be captured, wherein the plurality of images can be video data. For instance, standardized templates, user-defined templates, and/or standardized templates edited by a user can be employed to automatically create an advertisement for the captured image. It is to be appreciated that any suitable templates can be utilized, wherein such templates can be based on various factors such as, but not limited to, image type, image size, item, good, service, target environment, target audience, type/nature of posting or advertisement, cost, terms, geographic location, device used to capture image data, any suitable characteristic related to an advertisement, etc. For example, a specific template can relate to rental properties that can be published on a rental property website in which the template includes optimal characteristics (e.g., font, size, image location, layout, etc.).

At reference numeral 806, the advertisement can be populated with descriptive data and geographic data. The descriptive data can be identified and/or generated by at least one of the following: receiving audio input from a user and converting such speech to text; dynamically extracting key words from text and filling appropriate fields; a service that populates data for the captured image; or using pattern recognition on the received image data. Furthermore, the descriptive data can include geographic information related to the location of the product and/or seller. For example, any suitable technique can be implemented to identify a geographic location associated with a good and/or service to which image data relates, wherein the technique can be, but is not limited to: a global positioning system (GPS), phone number geographic tracking, triangulation, location registry, cell tower location, user-informed location data, etc.

At reference numeral 808, the advertisement can be selectively published to an environment. In general, upon automatic creation of the advertisement related to the captured image data (e.g., wherein such creation can be based upon the activation of the "one-click" feature), the advertisement can be published and/or exposed to an online environment such as, but not limited to, the Internet, a network, a networked community, a forum, a website, a blog, an email list server, an email address, a social network, a server, a group, a user, a company, a business, etc. Yet, the advertisement can be selectively published to a particular portion of the environment. In other words, the advertisement can be selectively exposed to selected entities (e.g., users, businesses, groups, machines, computers, websites, networks, servers, email addresses, user profiles, etc.) within the target environment. Thus, the exposure of the advertisement distribution can be limited and/or broadened. For example, an advertisement can be automatically created for a picture of a motorcycle in which such advertisement can be selectively published to members of motorcycle groups on the Internet than exposing such advertisement to every user/client on the Internet.

Figure 9:
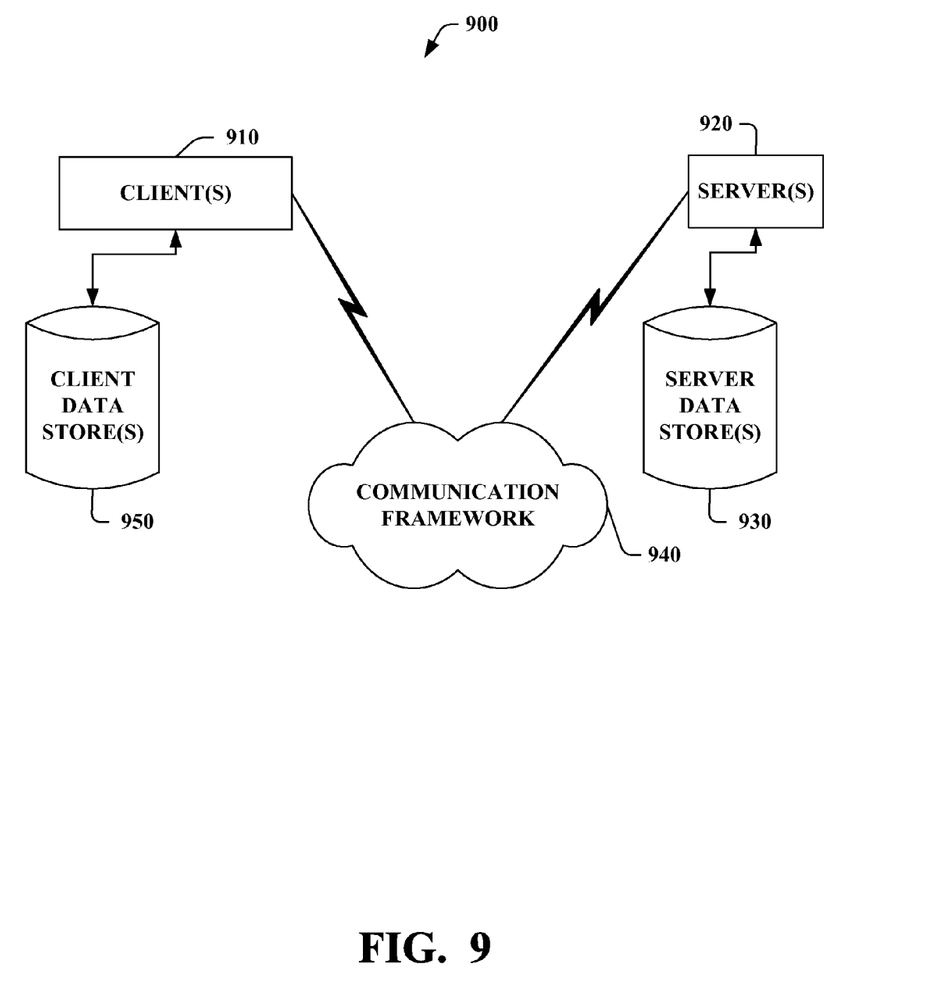
FIG. 9 illustrates an exemplary networking environment, wherein the novel aspects of the claimed subject matter can be employed.
Figure 10:
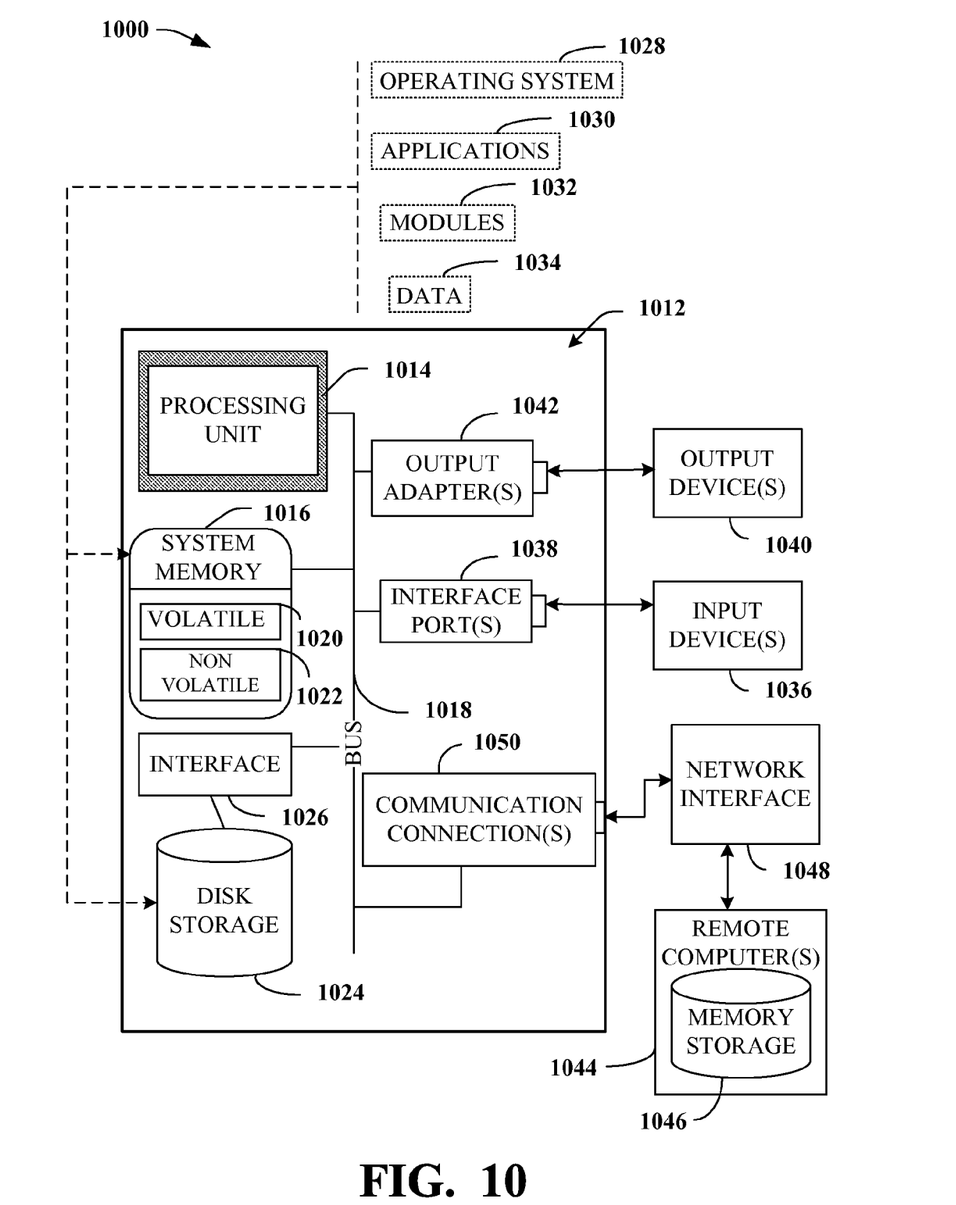
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an automatic posting component that facilitates creating an advertisement with descriptive data with minimal user intervention, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates automatically generating an advertisement, comprising:
   one or more computing devices with one or more processors that execute:
   (1) an interface component that receives, from a user, a portion of image data related to at least one of a good or a service associated with a transaction; and
   (2) an automatic posting component that is triggered by a single user activation to automatically abstract information from the image data and to use the information for generating an advertisement with a portion of descriptive data related to at least one of the good or the service based at least in part upon the image data, wherein the advertisement is published to an environment.

2. The system of claim 1, the advertisement is automatically generated and published to the environment upon an activation of a "one-click" feature.

3. The system of claim 1, further comprising a device that captures the portion of image data, the device is at least one of a camera, a video camera, a video device, a camera portable device, a camera cellular phone, a portable digital assistant, a laptop, a smartphone, a hand-held device, a camera-based computing device, a mobile communications device, a portable device, a device including a camera, a web-cam, or a desktop camera device.

4. The system of claim 1, the environment is at least one of the Internet, a network, an online environment, a networked community, a forum, a website, a blog, an email list server, an email address, a social network, a server, a group, a user, a company, or a business.

5. The system of claim 1, further comprising a template component that employs a template for structure related to the advertisement, the structure includes at least one of a font, a font size, an image location, a text layout, or an organization of descriptive data.

6. The system of claim 5, the template is at least one of a standardized template, a user-defined template, or a standardized template edited by a user.

7. The system of claim 5, the template component allows accessibility to a plurality of templates by employing at least one of a service, a community, or a forum, allowing at least one of template sharing, template distribution, template sharing, template purchasing, or template assistance.

8. The system of claim 5, the template component identifies a template for the advertisement based upon a characteristic of the advertisement, the characteristic is at least one of an image type, an image size, an item, a good, a service, a target environment, a target audience, a type/nature of the advertisement, a cost, a term, a geographic location, or a device used to capture image data.

9. The system of claim 1, further comprising a populate component that annotates the advertisement with a portion of descriptive data.

10. The system of claim 9, the populate component identifies descriptive data by at least one of the following:
    receiving audio input from a user and converting the audio input to text for the advertisement;
    dynamically extracting a key word from text and filling an appropriate field within the advertisement;
    a service that provides descriptive data based upon received image data; or using pattern recognition on the received image data.

11. The system of claim 10, the descriptive data is related to at least one of text, an image, contact information, a sale price, a transaction detail, shipping information, an instruction manual, a product detail, manufacturer information, a pricing detail, a term of sale, seller information, geographic data, profile data, listing field data, data related to the good, data related to the service, or transactional data.

12. The system of claim 1, further comprising a location component that identifies a portion of geographic data associated with the advertisement, the geographic data relates to at least one of the good, the service, a seller, an owner, a user profile, a user location, a residence, or a place of business.

13. The system of claim 12, the location component identifies the portion of geographic data utilizing at least one of a global positioning system (GPS), phone number geographic tracking, a triangulation technique, a location registry, a cell tower location, a portion of user-informed location data, or location registration based upon image capture.

14. The system of claim 12, the location component incorporates the portion of geographic data into the advertisement.

15. The system of claim 1, further comprising an exclusivity component that enables the advertisement to be exposed to a portion of the environment.

16. A computer-implemented method that facilitates automatically storing advertising data to an online environment with minimal user intervention, comprising:
    activating a "one-click" feature to initiate an automatic advertisement generation;
    capturing image data from a device based at least in part upon the "one-click" feature, wherein the image data originates from an image transmitted by a user from an auxiliary device to the device;
    performing pattern recognition on the image data to extract descriptive data from the image data;
    creating an advertisement for the captured image data using the descriptive data;
    populating the advertisement with a portion of descriptive data; and
    publishing the advertisement to an online environment.

17. The method of claim 16, further comprising:
    receiving audio input from a user and converting the audio input to text to populate the advertisement with descriptive data;

dynamically extracting a key word from text and filling an appropriate field within the advertisement;
employing a service that provides a portion of descriptive data based upon captured image data; and
using pattern recognition on the captured image data to populate the advertisement with descriptive data.

18. The method of claim 16, further comprising:
utilizing a template for the advertisement to provide at least one of a structure or a layout of data;
selectively publishing the advertisement to the online environment;
ascertaining a portion of geographic data related to the advertisement; and
annotating the advertisement to include the portion of geographic data.

19. The method of claim 16, the device is at least one of a camera, a video camera, a video device, a camera portable device, a camera cellular phone, a portable digital assistant, a laptop, a smartphone, a hand-held device, a camera-based computing device, a mobile communications device, a portable device, a device including a camera, a web-cam, or a desktop camera device.

20. A computer-implemented method that facilitates automatically posting data to an online environment, comprising:
receiving an image uploaded by a user from an auxiliary device;
based on a single user activation, extracting image data from the image;
based on the single user activation, sending a request to a service for descriptive data relevant to a good or service related to the image data extracted from the image;
receiving the descriptive data from the service;
automatically generating, using the descriptive data and the image data, an advertisement based at least in part upon the image data; and
automatically publishing the advertisement to an online environment.

* * * * *